(No Model.)

J. W. THOMPSON.
STEAM ENGINE GOVERNOR.

No. 314,353. Patented Mar. 24, 1885.

WITNESSES.
R. H. Whiteley
C. M. Clarke

INVENTOR.
Jas. W. Thompson
by J. Snowden Bell
Atty.

United States Patent Office.

JOSEPH W. THOMPSON, OF SALEM, OHIO, ASSIGNOR OF ONE-HALF TO THE BUCKEYE ENGINE COMPANY, OF SAME PLACE.

STEAM-ENGINE GOVERNOR.

SPECIFICATION forming part of Letters Patent No. 314,353, dated March 24, 1885.

Application filed November 29, 1884. (No model.)

*To all whom it may concern:*

Be it known that I, JOSEPH W. THOMPSON, of Salem, in the county of Columbiana and State of Ohio, have invented certain new and useful Improvements in Steam-Engine Governors, of which improvements the following is a specification.

My invention relates to centrifugal governors or regulators of the class set forth in the following Letters Patent of the United States, upon which it is an improvement, to wit: Reissued Letters Patent No. 8,433, dated September 24, 1878, to myself and the Buckeye Engine Company as my assignee, and Letters Patent No. 204,924, dated June 18, 1878, to myself and Nathan Hunt and said Buckeye Engine Company as our assignee.

The object of my present invention is to promote the attainment of perfect isochronal regulation by counteracting the variable accretion of centripetal force induced in the operation of a governor of the type above specified by the action of the resistance of the parts actuated by the movable eccentric under different degrees of leverage in different positions of the weight-arms.

To this end my invention, generally stated, consists in the combination, with a movable valve-operating device and weighted arms and springs adapted to vary the position thereof in opposite directions by the action of centrifugal and centripetal force, respectively, of auxiliary centrifugally-acting springs adapted to supplement the action of the weights during the moiety of the traverse of their arms adjacent to the inward limit of their range of motion.

The improvements claimed are hereinafter fully set forth.

Figure 1:
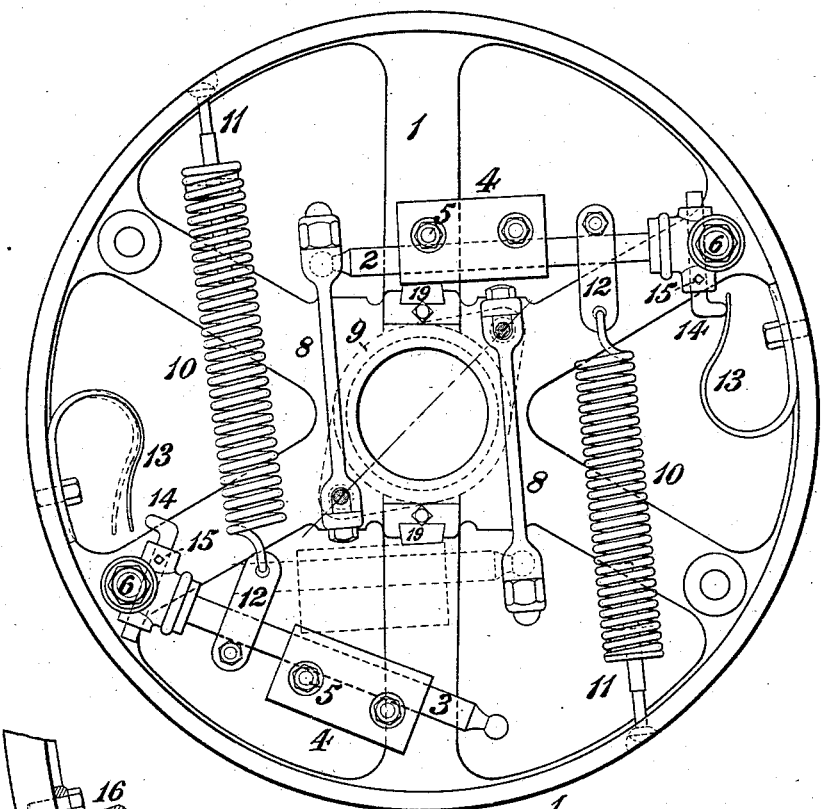
Figure 2:
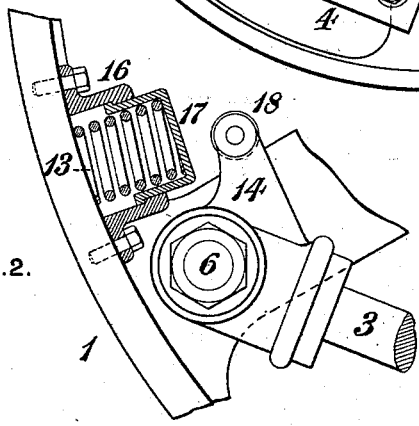

In the accompanying drawings, Figure 1 is a face view of a governor embodying my invention; and Fig. 2, a similar view on an enlarged scale of a portion of the same, illustrating a modification of the auxiliary springs.

To carry out my invention I provide as a support for the operative mechanism of the governor a wheel or disk, 1, which may either be the fly-wheel of the engine or a wheel or case specially designed for the purpose, and separately secured upon the crank-shaft or upon an auxiliary shaft driven therefrom. A pair of weight-arms, 2 3, each carrying a weight, 4, which is secured adjustably upon the arm by bolts 5, or set-screws, is pivoted to the wheel 1 at points diametrically opposite thereon and adjacent to the periphery by pins or studs 6, and the opposite ends of the weight-arms 2 3 are coupled by links 8 to arms or lugs upon a hub or sleeve, 9, (shown in dotted lines,) which fits freely on the shaft on which the wheel is mounted, said hub serving to transmit movement from the shaft of the wheel 1 to a member adapted to effect the movement of a valve, which member in this case would be an eccentric formed with or secured to the hub 9, by the angular adjustment of which eccentric with the hub 9 about the axis of the wheel in accordance with the vibrations of the weight-arms about their pivots 6 regulation is effected by variations in the travel of the valve, and thereby in the period of steam-admission.

The tendency to outward movements of the weight-arms 2 3 under the influence of centrifugal force in the rotation of the wheel 1 is opposed by the centripetal action of the tension of a pair of springs, 10, each of which is connected at one end by means of a screw, 11, through which its tension can be adjusted to the wheel 1, and is coupled at its opposite end to a lug or hook, 12, secured to one of the weight-arms.

So far as stated, my present construction accords substantially with those of the Letters Patent hereinbefore specified, and, in the absence of the improvements further to be described, would fail to accord as perfect isochronal regulation as is, in many instances, desirable, in the particular that, inasmuch as the resistance of the parts actuated by the eccentric or other valve-operating device tends to move the latter in reverse direction to the movement of the shaft and to draw inwardly the weight-arms, such resistance acts centripetally and tends to induce higher speed, and is, further, more effective in producing such result when the weight-arms are at their extremes of movement, the angles of the links 8 with radii drawn to their inner ends then being acute or obtuse, than when midway of their range of movement, when said angles are right angles. It follows from such variable addition to the centripetal force of the springs 10, that, an adjustment of tension being given to said springs which would otherwise be isochronal, the conditions prevailing during the inner half of the range of movement of the weight-arms are analogous to those which would be induced by more than isochronal tension, and the conditions prevailing during the outer half of said range are analogous to those due to less than isochronal tension. As a consequence the tension required for the best regulation when the weight-arms are in the outer half of their adjustment range is greater than that required for the inner half. In order to compensate for such increase of centripetal force, and to enable the tension of the springs 10 to be correctly adjusted for the outer half of the range of movement of the weight-arms 2 3, I provide means for counteracting such proportion of the combined centripetal forces as will prevent the excess which would without such provision exist during the inner half of said range of movement. To this end a pair of auxiliary springs, 13, the tension of which acts in accord with the centrifugal action of the weights 4—that is to say, to resist the inward movement of the weight-arms 2 3—is secured to the wheel 1 on opposite sides of its center and adjacent to its periphery, said springs being so located relatively to the weight-arms as to be compressed by and exert their tension outwardly upon the latter during the traverse thereof from their positions nearest the center of the wheel 1 to the middle of their range of motion, or thereabout—that is to say, throughout substantially the inner half of their traverse about their pivots 6—and to be inactive during the remainder or outer half thereof. The weight-arms 2 3 bear against the auxiliary springs through fingers 14, which are fitted adjustably in openings formed in the pivot-heads of the arms, and are secured in position by set-screws 15, so as to admit of their projection from the weight-arms being increased or diminished, as may be desired, to vary the effective force of the auxiliary springs on the weight-arms.

In the drawings the upper weight-arm, 2, is shown as in its extreme inward position, with its weight 4 abutting against a stop, 16, on the supporting-wheel, and the lower weight-arm, 3, is detached from its link 8 and moved into its extreme outer position, its auxiliary spring 13 being shown in full lines in the position which it occupies during the outer half of the traverse of the weight-arm, and in dotted lines in the position into which it is compressed by the movement of the arm to the inner extremity of its traverse. The finger 14, which is now out of contact with the spring 13, will, as the arm is moved inward by its main centripetally-acting spring 10, gradually approach the spring 13, with which it will come in contact when about one-half of the inward movement has been accomplished. During the remainder of the inward movement of the weight-arm it will continue to be opposed by a regularly-increasing resistance of the spring, acting in supplement to the centrifugal action of its weight, until it reaches its extreme inner position, when the spring 13 will have been bent to the form indicated by the dotted lines.

I do not limit myself to the specific form and arrangement of the parts described and shown, as it will be obvious that the same may be varied in sundry particulars without departing from the spirit of my invention. Thus, for example, helical auxiliary springs, as shown in Fig. 2, may be substituted for the plate-springs of Fig. 1, and inclosed in cases 16, secured to the wheel 1, and provided with movable caps or followers 17. The outer ends of the fingers 14 may be provided with friction-rollers 18, adapted to make contact with the auxiliary springs or their caps or followers, as also shown in Fig. 2. Further, in lieu of being coupled directly to a hub or sleeve concentric with the shaft of the wheel 1, the links 8 may, if desired, be connected to arms upon a short adjusting-shaft mounted in bearings in the wheel 1 eccentrically to its center of rotation, said shaft actuating the valve either directly, as by a wrist-pin or eccentric which it carries, or indirectly by effecting the movement of a valve-operating eccentric separately connected to the supporting-wheel and coupled to the adjusting-shaft, so as to partake of the movements imparted to the latter by the vibrations of the weight-arms.

I claim as my invention and desire to secure by Letters Patent—

1. In a centrifugal governor of the type specified, the combination, substantially as set forth, of a movable valve-operating device, a weighted arm and centripetally-acting spring adapted to vary the position of such device in opposite directions by the action of centrifugal and centripetal force, respectively, and an auxiliary spring adapted to supplement the centrifugal action of the weight during the moiety of the traverse of its arm adjacent to the inward limit of its range of motion.

2. In a centrifugal governor, the combination, substantially as set forth, of a supporting wheel or case, weighted arms pivoted to said case and coupled to a valve-operating device which is movable independently of the shaft of the supporting-wheel, springs coupled at one end to the weight-arms and at the other to the supporting-wheel, and auxiliary springs secured to said wheel in such relation to the weighted arms as to be subject to compression therefrom during substantially the inner half of their range of movement.

3. In a centrifugal governor, the combination, substantially as set forth, of a supporting wheel or case, an auxiliary spring connected thereto, a weighted arm pivoted thereto, and a finger connected adjustably to the weighted arm and adapted to bear against the auxiliary spring during a portion of the traverse of the arm about its pivot.

4. In a centrifugal governor, the combination, substantially as set forth, of a supporting wheel or case, a helical auxiliary spring fitting in a case secured thereto, a movable cap or follower fitting over said spring, and a weighted arm pivoted to the supporting-wheel, and provided with a projecting finger adapted to bear upon said movable cap during a portion of the traverse of the arm about its pivot.

JOSEPH W. THOMPSON.

Witnesses:
MARTIN V. DICKINSON,
PETER AMBLER.